Dec. 1, 1953  J. A. GREGOIRE  2,661,204
SUSPENSION OF VEHICLES
Filed Aug. 8, 1949  2 Sheets-Sheet 2

INVENTOR
Jean A. GREGOIRE
BY
Jewett, Mead & Browne
ATTORNEYS

Patented Dec. 1, 1953

2,661,204

UNITED STATES PATENT OFFICE 2,661,204

SUSPENSION OF VEHICLES

Jean Albert Gregoire, Paris, France

Application August 8, 1949, Serial No. 109,104

Claims priority, application France
August 17, 1948

6 Claims. (Cl. 267—16)

My invention relates to improvements in suspension means for vehicles assuming a variable flexibility of the type disclosed more particularly in applicant's prior copending application Serial No. 791,838, filed on December 15, 1948.

It relates more particularly to arrangements of said type including in combination a spring blade or the like conventional suspension and a coil spring or the like correcting suspension arranged slopingly and acting on the axle of the vehicle in a plane parallel to the longitudinal axis of symmetry of the vehicle.

In arrangements of this type, it often occurs that a spring coil acting on the axle or on another member rigid with the axle exerts on the latter a torsional stress that is transmitted to the main suspension spring that may be a spring blade or any other type of spring whereby said spring is deformed under conditions that are not favorable.

The present invention has for its object to remove such drawbacks.

To this purpose, it consists chiefly in connecting the point at which the coil spring is connected with the axle with the chassis or suspended portion of the vehicle through the agency of a stay member constituted by a cable, a connecting rod or the like, the point at which it is pivoted or secured to the suspended portion of the vehicle being selected so as to constrain the axle, in its displacements with reference to said suspended portion to execute substantially the translational movement it would normally assume without the incorporation of the correcting spring.

Further objects and features of the present invention will appear in the reading of the following description of a preferred embodiment of my invention, reference being made to accompanying drawings illustrating diagrammatically by way of example and by no means in a binding sense various embodiments of said invention. In said drawings.

Figure 1:
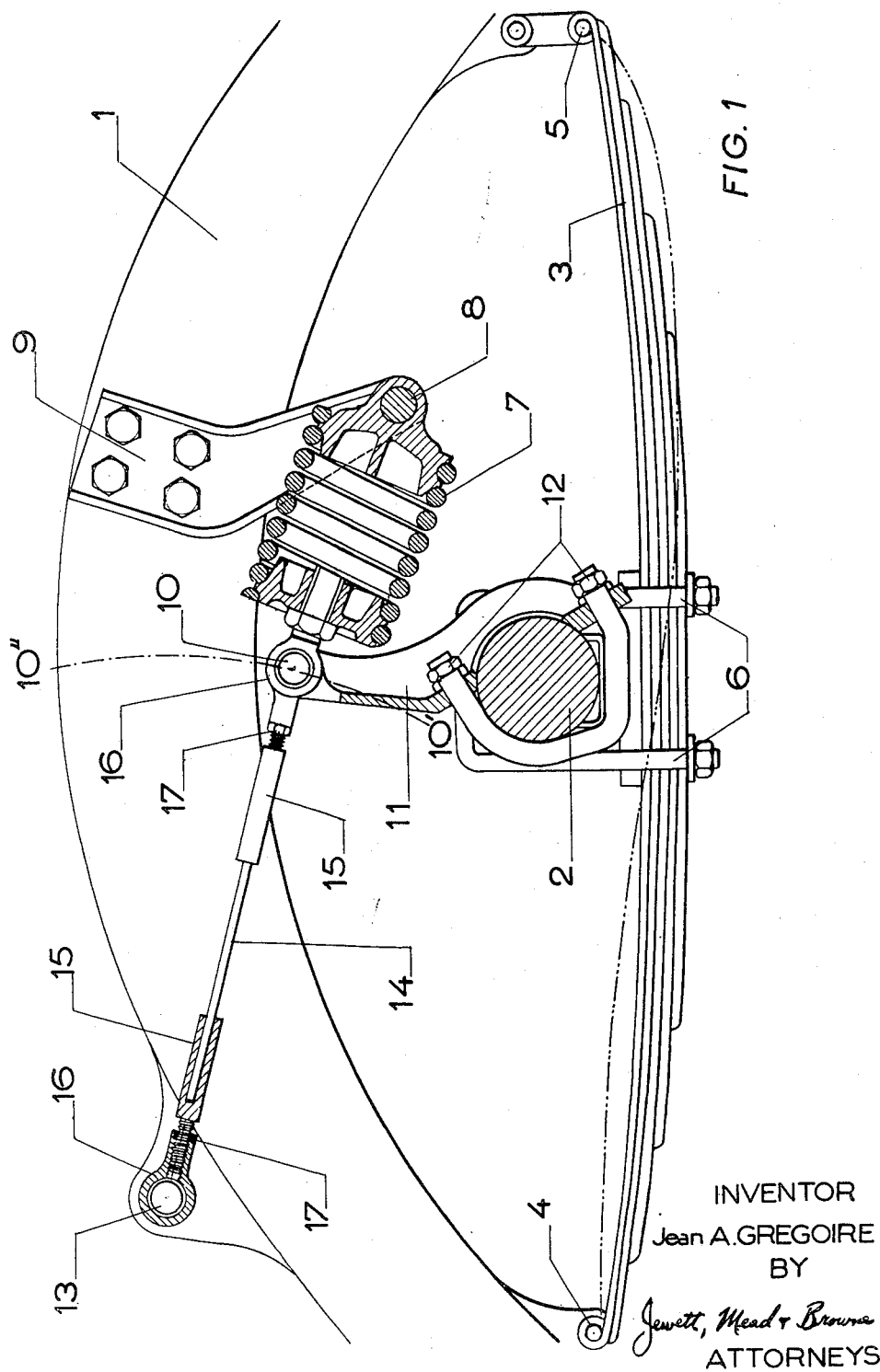
Fig. 1 is a longitudinal sectional partly elevational view of a suspension device of the variable flexibility type executed in conformity with the present invention.

In Fig. 1, 1 designates the chassis of a car and 2 the rear axle of said car that is connected with said chassis through a suspension assuming a variable flexibility such as that disclosed in applicant's above mentioned copending specification, the execution of which is disclosed briefly hereinafter.

Said prior arrangement includes: a multiple spring blade 3 of the semi-elliptic type pivotally secured at 4 and 5 respectively to a member connected directly with the chassis 1 and to a member connected therewith through the agency of shackles. The axle 2 is secured in the standard manner at the middle of spring blade 3 through a bolting system 6; a coil spring 7 that is pivotally secured through one end 8 to a bracket 9 rigid with the chassis 1 while its other end 10 is secured to a member 11 rigid with the axle and bolted thereto at 12.

As disclosed in applicant's prior above-mentioned copending application, when the stresses exerted on the chassis vary, the suspension device that has been described is deformed and its flexibility varies with the load in accordance with a predetermined law.

The arrangement disclosed shows however the following drawback.

As the load increases, the coil spring 7 exerts a stress having a vertical and a horizontal component, the vertical component increases the stress exerted by the blade spring 3 and opposes thus the action of the increased load, this being in accordance with the part it has to play as disclosed in above mentioned copending application.

On the other hand the horizontal component exerts on the axle 2 a substantial torsional stress which is transmitted to the spring 3 so that a certain flexional straining leads to a deformation of said spring 3. The latter has a tendency to assume a position such as that illustrated in dot-and-dash lines in Fig. 1; this deformation of the spring 3 provides in its turn a rotation of the axle that reduces the tensioning and thereby the efficiency of the spring 3. This drawback is double inasmuch as it reduces the action of said spring 7 and constrains the spring 3 to operate under poor conditions.

This drawback is removed according to the present invention by connecting the pivotal point 10 between the spring 3 and the member 11 or more generally speaking, any point of said member 11 to a pivotal point 13, provided on the suspended portion of the vehicle, such as the chassis for instance, said connection being provided through a stay, cable or the like that constrains the point 10 to describe the arc of a circle round the pivotal axis 13 of said stay. According to the invention, the point 13 is selected in a manner such that this circle may correspond to the curve that would be described by the point 10, if the action of the spring 7 did not exist, whereby the movement of the axle and of the member 11 during the movement of the springs, may correspond substantially to the translational movement disclosed. Thus, the axle is submitted to no torsional strain and the spring 3 is deformed in a normal manner.

In practice, the pivotal center is defined as follows: The spring 7 being disconnected, the spring 3 is caused to bend through a gradual load acting on its center, said bending being similar to that provided through the load of the vehicle, if the latter were suspended exclusively through the spring 3. The pivot 10 describes then a curve 10'—10—10". In the zone of utilization, said curve may be considered as approximating an arc of a circle, the center of which is constituted by the point 13 at which the stay is to be engaged.

This arrangement shows, moreover, the following advantage: It is well known that in most suspensions incorporating semi-elliptic springs arranged longitudinally, the latter must provide a reaction against braking torques.

In the arrangement according to the invention, these semi-elliptic springs are submitted only to the difference between the torques produced by the spring 7 and by the braking, which reduces the straining to a considerable extent.

Now, according to my invention, the stay illustrated in Fig. 1 is constituted by either a yielding cable, or a rigid stay 14 fitted in two threaded end pieces 15 that are screwed into eye-bolts 16 and held in position by lock nut 17. The eye-bolts are pivotally secured to the spindles 10 and 13 and the threaded end pieces allow adjusting the length 10—13 of the stay in accordance with the value obtained through the above disclosed method.

It is essential that the stay may be yielding or, if a rigid rod is used, it is necessary that the pivotal connections at 10 and 13 be elastic in all directions in space, or else form ball joints. As a matter of fact, if the two wheels on the same axle are not independent, when one is higher than the other, the axle slopes transversally and the points 8, 10, 13 are no longer in a same plane. The yieldingness of the cable 14 allows such tranversal displacements of the point 10.

Figure 2:
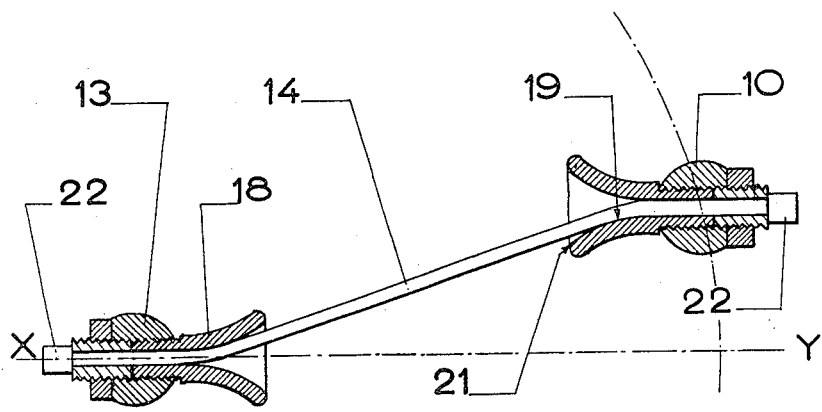
Fig. 2 illustrates cross sectionally a modification of the arrangement of Fig. 1.
Figure 3:
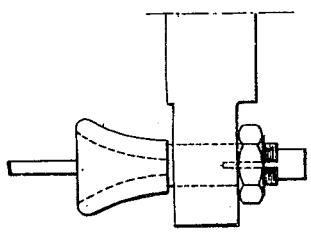
Fig. 3 is a corresponding view from above of part of the arrangement illustrated in Fig. 2.

Fig. 2 illustrates a modified embodiment of the stay. A cable 14 is used again in this case, but the pivotal connections are done away with, so as to remove the necessity of lubrication.

Inside the end-pieces 10 and 13 are screwed flaring members 18. When the staying cable held axially of the end-pieces moves out of the position of alignment XY for which the cable 14 is rectilinear, said cable engages the inner curvilinear wall of the flaring members in the same manner as it would wind over a pulley. The curvature of said wall that may assume a constant radius or preferably a radius decreasing from the inner point 20 to the outer point 21 is defined in a manner such that the strain of each wire forming the cable 14 may remain underneath a safe value.

The ends of the cable are fitted in ferrules 22 that abut against the flaring members 18 corresponding thereto. The length 10—13 is adjusted by screwing and unscrewing the flaring members inside the end pieces 10 and 13. Such an arrangement allows a relative shifting between the points 10 and 13, both in a vertical longitudinal plane, and in directions perpendicular to said plane.

It will be noticed that the adjusted distance 10—13 does not remain constant by reason of the curvature assumed by the end of the cable, but in the practical zone of utilisation, the variation is extremely small and negligible.

It is possible to execute the stay in various other manners without widening thereby the scope of the invention as defined in accompanying claims. In fact, it is possible, if required, to locate the point 13 in a position that does not correspond exactly with the theoretical location defined hereinabove: as a matter of fact, it may be impossible, for reasons of bulk, to use the ideal position thus defined. However, it is necessary to be as near as possible such an ideal position, but the fact of moving away from it has no further drawback than that of increasing the strain exerted on the blade-spring.

The invention, of course, is applicable to any suspension means incorporating springs other than semi-elliptic springs.

In the following claims, the plane of symmetry of the vehicle should be construed as relating to the longitudinal vertical plane passing at equal distances from and between the front wheels and the rear wheels of said vehicle.

What I claim is:

1. In combination with a vehicle, the provision of a wheel-carrier, a chassis, a coil spring acting eccentrically on the wheel-carrier, and held between a point of the wheel-carrier, and a point of the chassis, said two points defining a line that is substantially parallel with the plane of symmetry of the vehicle and sloping with reference to horizontality, a further spring connecting the wheel-carrier with the chassis and a cable connecting the first point on the wheel-carrier with a point on the chassis and guiding members at each end of the yielding member assuming a flaring shape opening towards the cooperating member for guiding the yielding member passing out of said guiding member.

2. In a vehicle including a chassis and two wheels arranged symmetrically of the longitudinal vertical plane of symmetry of the vehicle, the combination with each wheel of a wheel carrier, a coil spring acting eccentrically on the wheel-carrier, and held between a point of the wheel-carrier and a point of the chassis, said two points defining a line that is substantially parallel with the vertical longitudinal plane of symmetry of the vehicle and that is sloping with reference to horizontality, a blade spring connecting the wheel-carrier with the chassis and lying substantially in the vertical plane passing through the axis of the coil spring and a practically non-extensible brace connecting the first point on the wheel carrier with a point of the chassis.

3. In a vehicle including a chassis and two wheels arranged symmetrically of the longitudinal vertical plane of symmetry of the vehicle, the combination with each wheel of a wheel-carrier, a coil spring acting eccentrically on the wheel-carrier and held between a point of the wheel-carrier and a point of the chassis, said two points defining a line that is substantially parallel with the vertical longitudinal plane of symmetry of the vehicle and that is sloping with reference to horizontality, a blade spring connecting the wheel-carrier with the chassis and lying substantially in the vertical plane passing through the axis of the coil spring and a practically non-extensible brace connecting the first point on the wheel-carrier with a point of the chassis and extending substantially in the same direction as an beyond the axis of the coil spring on the side opposed to the second point through which the coil spring is secured to the chassis.

4. In a vehicle including a chassis and two wheels arranged symmetrically of the longitudinal vertical plane of symmetry of the vehicle, the combination with each wheel of a wheel-carrier, a coil spring acting eccentrically on the wheel-carrier, and held between a point of the wheel-carrier and a point of the chassis, said two points defining a line that is substantially parallel with the vertical longitudinal plane of symmetry of the vehicle and that is sloping with reference to horizontality, a blade spring connecting the wheel-carrier with the chassis and lying substantially in the vertical plane passing through the axis of the coil spring and a practically non-extensible brace connecting the first point on the wheel-carrier with a point of the chassis, said point on the chassis being selected so as to constrain the axis of the wheel to assume a substantially rectilinear movement, under the action of varying loads.

5. In a vehicle including a chassis and two wheels arranged symmetrically of the longitudinal vertical plane of symmetry of the vehicle, the combination with each wheel of a wheel-carrier, a coil spring acting eccentrically on the wheel-carrier, and held between a point of the wheel-carrier and a point of the chassis, said two points defining a line that is substantially parallel with the vertical longitudinal plane of symmetry of the vehicle and that is sloping with reference to horizontality, a blade spring connecting the wheel-carrier with the chassis and lying substantially in the vertical plane passing through the axis of the coil spring and a cable connecting the first point on the wheel-carrier with a point on the chassis.

6. In a vehicle including a chassis and two wheels arranged symmetrically of the longitudinal vertical plane of symmetry of the vehicle, the combination with each wheel of a wheel-carrier, a coil spring acting eccentrically on the wheel-carrier, and held between a point of the wheel-carrier and a point of the chassis, said two points defining a line that is substantially parallel with the vertical longitudinal plane of symmetry of the vehicle and that is sloping with reference to horizontality, a blade spring connecting the wheel-carrier with the chassis and lying substantially in the vertical plane passing through the axis of the coil spring and a rigid stay connecting the first point on the wheel-carrier with a point on the chassis.

JEAN ALBERT GREGOIRE.

References Cited in the file of this patent

UNITED STATES PATENTS

| Number | Name | Date |
|---|---|---|
| 176,570 | Worrell | Apr. 25, 1876 |
| 1,056,406 | Eastman | Mar. 18, 1913 |
| 1,800,442 | Duby | Apr. 14, 1931 |
| 1,877,878 | Horstmann | Sept. 20, 1932 |
| 2,264,070 | Davis | Nov. 25, 1941 |
| 2,299,900 | Jackson | Oct. 27, 1942 |

FOREIGN PATENTS

| Number | Country | Date |
|---|---|---|
| 251,581 | Great Britain | July 8, 1926 |
| 557,275 | France | May 1, 1923 |